June 5, 1956   M. W. TORRENCE   2,748,963
APPARATUS FOR CONVEYING HOT METAL
Filed Sept. 15, 1955   2 Sheets-Sheet 1

June 5, 1956 M. W. TORRENCE 2,748,963
APPARATUS FOR CONVEYING HOT METAL
Filed Sept. 15, 1955 2 Sheets-Sheet 2
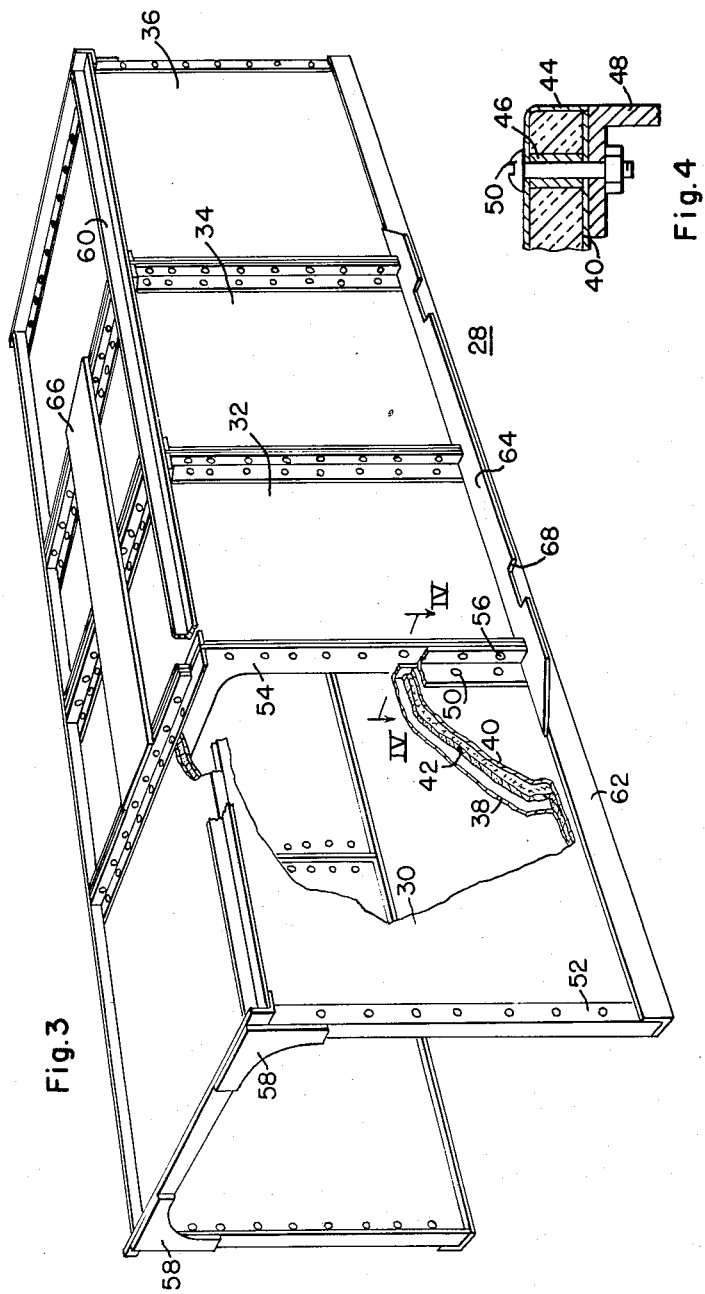
INVENTOR
Miller W. Torrence
BY
James N. Ely
ATTORNEY United States Patent Office 2,748,963
Patented June 5, 1956

2,748,963

APPARATUS FOR CONVEYING HOT METAL

Miller W. Torrence, Tarentum, Pa., assignor, by mesne assignments, to Clark Equipment Company, a corporation of Michigan Application September 15, 1955, Serial No. 534,506

6 Claims. (Cl. 214—392)

This invention relates to apparatus for conveying hot metal and in particular for conveying hot metal in massive form such as ingots and intermediate steel mill products.

In the steel industry molten metal is cast in the form of ingots which are then stripped from the molds and must be conveyed from one location to another for processing through the bloom, billet or slab form into the form of finished product such as bar, sheet and strip or the like. In processing the ingot, bloom, billet and slabs it is necessary to heat such initial and intermediate products to a high temperature of the order of 2100° F. to 2550° F. depending upon the type of steel, so that such products can be hot worked into the following form necessary for processing the steel into the final form. Further, the steel ingot is stripped from the mold in the hot condition and must be conveyed to a soaking pit and from thence to apparatus for processing such ingot into an intermediate product such as bloom, billet or slab. Where the intermediate products are to be further worked they are heated and must be conveyed from the heating furnace to the mill for further processing. Heretofore the only means of conveying such heated steel products was by means of intermill railroads having suitable gondola cars for carrying such massive heated products, or by means of overhead cranes capable of supporting the massive heated products. As will be appreciated, the channels of conveyance available heretofore were substantially fixed and entailed the use of considerable equipment and manpower.

In recent years straddle trucks of the type manufactured and sold by the Ross Carrier Division of the Clark Equipment Company have been widely used in industry for conveying massive inanimate objects and such carrier trucks have found some use in the steel industry for conveying coils, bars, sheets and the like from one point to another, such inanimate material being in the cold condition. As is well known, the straddle trucks are available in many different sizes and are usually designed depending upon the type of product which is to be conveyed thereby. Thus the straddle trucks may be provided with an unusually wide arch for handling wide materials between the supporting rubber tired wheels of the truck, or may be provided with extreme height under the arch for handling unusually high loads. Although such straddle trucks are well known and have found some application in the steel industry, it has been impossible heretofore to utilize such straddle trucks in the conveying of massive hot metal in the form of ingot or intermediate product because the heat radiated from such massive hot metal has a detrimental effect on the rubber tired wheels supporting the straddle truck and on the construction of the straddle truck, as well as definitely affecting the operator of the straddle truck who is usually seated on the upper portion of the frame forming the carrying arch of the truck.

An object of this invention is to provide apparatus for conveying hot metal in the form of ingot and intermediate product.

Another object of this invention is to provide, in apparatus for conveying hot metal in the form of ingot and intermediate product, of means for supporting such hot metal together with removable means for providing an insulating heat barrier between the hot metal and the conveying apparatus.

A further object of this invention is to provide for the efficient conveying of hot metal in the form of ingot and slab without detrimentally affecting the conveying means while protecting the hot metal from adverse weather conditions.

Other objects of this invention will become more apparent from the following description when taken in conjunction with the accompanying drawing in which:

Fig. 3 is a view in perspective, with parts broken away, of an insulating hood utilized in the conveying apparatus of Figs. 1 and 2, and Fig. 4 is a fragmentary view in cross section taken along the line IV—IV of Fig. 3.

Figure 2:
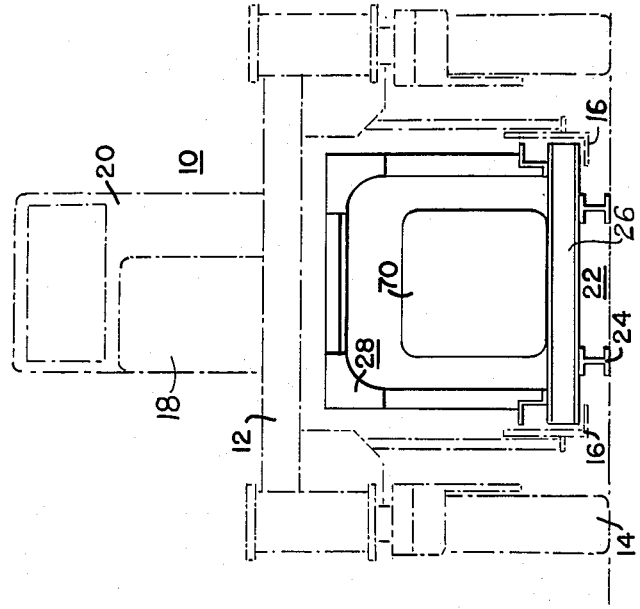
Fig. 2 is a view in front elevation of the apparatus of Fig. 1.
Figure 1:
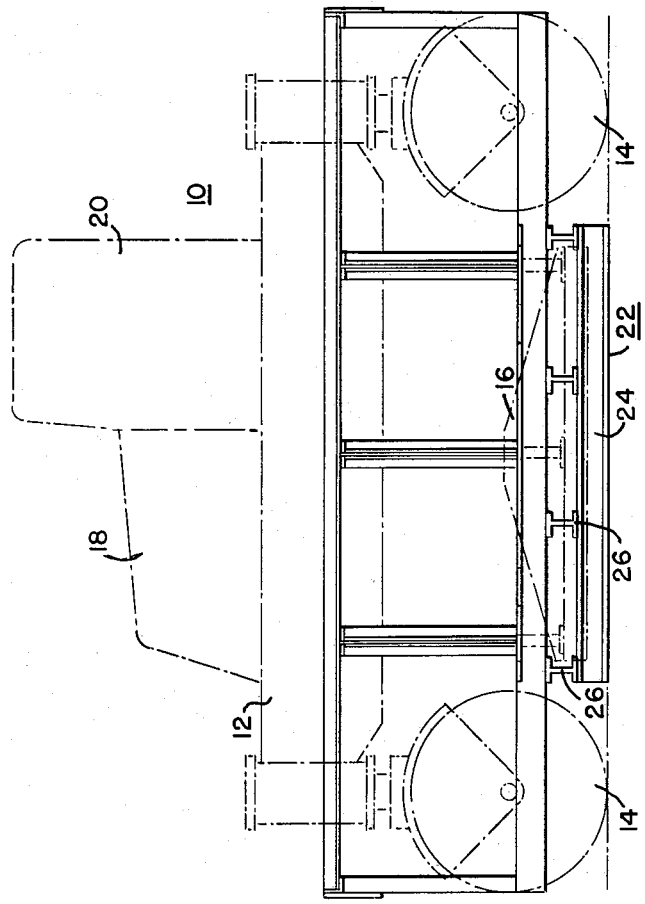
Figure 1 is a view in side elevation and in dotted outline of conveying apparatus embodying the features of this invention.

Referring to the drawings, and in particular to Figs. 1 and 2 thereof, this invention is illustrated with reference to a straddle truck 10 shown in dotted outline and which comprises a frame body 12 having four spaced rubber tired wheels 14 disposed at the respective corners thereof, such rubber tired wheels being mounted in suitable spring suspension and steerable wheel assemblies as for example those shown and claimed in Patent No. 2,415,928 issued February 18, 1947, to W. A. Barr. The straddle truck 10 is provided with a pair of spaced, elongated lifting shoes 16 which are suitably mounted and disposed to be hydraulically operated to move inwardly and upwardly from the positions illustrated in Figs. 1 and 2, or to be operated in the reverse direction, that is, downwardly and outwardly to release the burden carried thereby. The construction and operation of the lifting shoes are well known as the straddle trucks are used in industry throughout the country and thus need not be further described. The engine for operating the straddle truck and providing a source of power for hydraulically operating the lifting shoes illustrated in Figs. 1 and 2 is housed in a suitable housing 18 carried by the frame body 12 and a cab 20 is provided thereon for the operator of the straddle truck.

In order to support hot metal in the form of ingot and intermediate product so that the same may be carried by the straddle truck 10, a pallet 22 capable of supporting the weight of the hot metal and withstanding the heat thereof is utilized. In the embodiment illustraed, the pallet 22 comprises a base formed of two substantially parallel spaced I-beams 24 having a length equivalent to at least the length of the ingot and a plurality of cross bars 26 formed of I-beams having a length sufficient to extend beyond the spaced I-beams 24 of the base. The I-beams 26 are disposed in spaced relation across the I-beams 24 and are welded thereto so as to form an integral unit. The I-beams 26 forming the width of the pallet 22 have a length less than the space between the spaced lifting shoes 16 of the truck 10 and may be engaged by such lifting shoes as will be described hereinafter.

In order to provide an insulating barrier between the hot metal which is to be carried on the pallet 22 and the straddle truck 10 and primarily the rubber tired wheels 14 thereof, a hood 28 is provided to be seated over the hot metal on the upper surface of the pallet 22. The hood utilized in the embodiment of this invention is shown somewhat in detail in Figs. 3 and 4 of the drawing and has a substantially inverted U-shape cross section. In the embodiment illustrated, the hood 28 is formed of a plurality of sections 30, 32, 34 and 36 which, when assembled in end to end relation, will have a length equal to the distance between the outer points of the front and rear rubber tired wheels 14 of the straddle truck 10. Each of the sections 30, 32, 34 and 36 is formed of two side panels and a top panel, each panel being formed of an inner sheath 38 and an outer sheath 40 of metal having at least one layer 42 of heat insulating material, such as, for example, fiber glass, disposed therebetween. The sheaths 38 and 40 and layer 42 of insulating material therebetween are maintained in assembled relation by suitably bolting the ends of such assembled layers as illustrated more clearly in Fig. 4 of the drawing. Thus the end of the inner sheath 38 is turned inwardly as at 44 against the end of the sheath 40 an amount equal to the thickness of the layer 42 which is to be maintained and cylindrical spacer members 46 of metal are disposed between the sheath 38 and sheath 40 to prevent crushing of the insulating material positioned therebetween when the layers are secured in assembled relation. An angle bar 48 is positioned against the outer surface of the sheath 40 along the edge thereof having suitable openings therein aligned with corresponding openings in the sheath 38 and with corresponding spacer member 46 for receiving bolts 50 therein, which bolts when tightened will maintain the layers in assembled relation.

In the case of the outer ends of the side panels of end sections 30 and 36 of the hood assembly, the angle bars 52 are turned so that one of the legs thereof covers the end of the assembled layers 38, 40 and 42, the angle bar 52 and ends of the assembled layers being secured by bolts extending therethrough and through spacer members in a manner similar to that described hereinbefore with respect to the angle bar 48 and associated layers. The end angle bars 52 of each of the top panels of end sections 30 and 36 is turned upwardly as illustrated. The top panel of each of sections 32, 34 and 36 is also formed in a manner similar to that of the side panel and the side panels and top panels are assembled by securing them to an intermediate rigid substantially U-shaped metallic brace member 54 which is of a size to extend to the outer edges of the angle bars 48, the angle bars 48 of the adjacent sections 30—32, 32—34 and 34—36 being secured to such brace members 54 as by means of bolts 56 extending therethrough. The upper corners of the end sections 30 and 36 are secured by welding corner plates 58 across the butting corners thereof to the angle bars 52 forming the ends of the panels.

In order to strengthen the hood 28, the upper corners of the brace members 54 and the outer edges of the angle bars 48 on the upper panels of the different sections are notched so as to receive a longitudinal angle bracing member 60 which is securely welded to the assembled angle bars 48 and bracing members 54 as well as the end of angle bars 52 of the top panels of the end sections. Similarly, the lower ends of the angle bars 48 and bracing members 54 of the different adjacent sections are notched at the lower ends thereof for receiving a longitudinal angle bracing member 62 which extends along the lower edge of the assembled sections, one leg of such angle member 62 extending inwardly along the lower edges of the side panels of the different sections. An elongated lifting lug 64 having a length substantially equivalent to the length of the lifting shoe 16 is disposed along the upper edge of each of the lower angle members 62 intermediate the ends thereof to abut the lower ends of the outwardly extending legs of the angle bars 48 and the reinforcing member 54 therebetween on each side of the hood 28, such lifting lugs 64 being securely welded to the upper edges of the angle members 62 and to the lower end of the angle members 48, the purpose of which will be explained more fully hereinafter. The top of the hood 28 is further reinforced as by means of a strip or plate 66 disposed to extend across and welded to the angle bars 48 of the assembled sections.

As will be appreciated, the hood 28 is of a size to accommodate an ingot or an intermediate steel mill product such as a bloom, billet or slab within the confines thereof so that when seated on the pallet 22 the hot metal will be completely insulated from the straddle truck utilized for conveying the assembled pallet, ingot and hood. In order to aid the operator of the straddle truck in determining the degree of engagement of the elognated lifting shoes 16 thereof with either the pallet 22 or the elongated lifting lugs 64 of the hood 28, the lifting lugs 64 are provided with spaced apertures or notches 68 extending inwardly from the outer edges thereof so that by looking down from the cab 20 through the frame body 12 the operator can readily ascertain the positioning of the lifting shoes 16 relative to the assembly of the components thereof.

In practice, an ingot 70 of hot metal weighing from 10,000 to 15,000 pounds is placed upon the pallet 22 by any suitable means. After the ingot 70 is positioned on the pallet 22, the straddle truck 10 is operated to straddle the hood 28 and the lifting shoes 16 are actuated inwardly and upwardly to engage the lifting lugs 64 thereof to support the hood 28 and raise it to a position where it can be conveyed into assembled relation with the pallet 22. Thus, after the hod 28 is lifted by the straddle truck 10, the straddle truck 10 is operated to a position where it straddles the pallet 22 supporting the ingot 70 of hot metal with the hood 28 positioned over the ingot 70. The lifting shoes 16 are then actuated downwardly to seat the hood 28 in position on the pallet 22 and are then actuated outwardly from engagement therewith to release the hood in such assembled position. The lifting shoes 16 are then further actuated downwardly and inwardly to engage the lower edges of the cross I-beams 26 of the pallet 22 whereby the entire assembly of the ingot on the pallet and the insulating hood can be picked up and conveyed by the truck 10 to a point where the ingot is to be further processed.

When the assembly is delivered to such point, the lifting shoes 16 are disengaged from the pallet 22 and are actuated upwardly and inwardly to engage the lifting lugs 64 of the hood 28 to lift the hood 28 from its assembled relation with the pallet 22. The straddle truck 10 is then actuated to a point remote from the pallet 22 whereby access may be had to the ingot 70 of hot metal carried thereby.

In practice, the hood 28 is of a length sufficient to extend lengthwise of the straddle truck 10 when seated over the hot metal 70 on the pallet 22 so as to provide a heat insulating barrier between the hot metal 70 and the straddle truck 10, and in particular between the hot metal and the rubber tired wheels 14 of the straddle truck 10. Thus the hood 28 is of a length equivalent to the length of the straddle truck 10 even though the ingot 70 may be of a length smaller than the length of the pallet 22 which is used to support such hot ingot. However, where a slab of hot metal is to be conveyed, the slab may extend throughout the length of the hood 28 and even beyond the ends of the straddle truck 10, for the hood 28 is effective in such case to provide a satisfactory insulating barrier to protect the straddle truck per se.

Since the ends of the hood 28 are open, it is apparent that in conveying hot metal 70 to the flow of air lengthwise through the hood 28 as the truck 10 is moved will aid in dissipating heat radiated from the hot metal, since the hood in effect forms a chimney around the hot metal. This further protects the straddle truck 10 from the effects of radiated heat from the hot metal 70 being conveyed. Further, where the open ends are utilized as described, it is not necessary for the straddle truck 10 to move in any given direction in either positioning the hood 28 or removing the hood from its assembled relation over the hot metal 70 on the pallet 22, as the hood 28 may be positioned or removed with respect to the hot metal from either end of the mass of hot metal supported on the pallet 22.

The apparatus of this invention has made it possible to considerably eliminate the locomotives, gondola cars and manpower previously required to convey hot metal in the form of ingots and slabs and the like from one position to another in the processing of hot metal from ingot size into marketable products. Further, no set pattern need be followed in conveying the hot metal, as the straddle truck is quite mobile and can be utilized in places where it is not feasible to utilize locomotives. Protection is thus provided for both the straddle truck and the operator thereof, it also being noted that the hood utilized is of a size to afford protection for the hot metal being conveyed during inclement weather such as in the case of rain or snow. The apparatus utilized in this invention is relatively simple but effective, and has produced considerable economies in the operation of steel mills. Such apparatus can be readily reproduced by anyone skilled in the art.

I claim:

1. In apparatus for conveying hot metal in the form of ingot and intermediate steel mill product and comprising a straddle truck supported for movement on spaced rubber tired wheels and having a pair of spaced inwardly extending lifting shoes disposed to be actuated inwardly and upwardly thereof, the combination therewith of, a metallic pallet for receiving and supporting the hot metal thereon, the pallet having a width greater than that of the hot metal but less than that of the space between the lifting shoes whereby the pallet may be engaged, lifted and supported by the lifting shoes when the truck is positioned to straddle the pallet, and a heat insulating hood of substantially inverted U shape in cross section having outwardly extending lifting lugs adjacent the lower edges thereof disposed to be engaged and supported by the lifting shoes when the truck is positioned to straddle the hood, the hood being disposed to be conveyed by the truck to seat in assembled relation on the pallet to cover the hot metal supported thereon, the hood being of a length sufficient to extend lengthwise of the straddle truck when seated over the hot metal on the pallet to provide a heat insulating barrier between the hot metal and the rubber tired wheels of the truck when the pallet, hot metal and hood assembly is carried by the lifting shoes of the truck.

2. In apparatus for conveying hot metal in the form of ingot and intermediate steel mill product and comprising a straddle truck supported for movement on spaced rubber tired wheels and having a pair of spaced inwardly extending lifting shoes disposed to be actuated inwardly and upwardly thereof, the combination therewith of, a metallic pallet for receiving and supporting the hot metal thereon, the pallet having a width greater than that of the hot metal but less than that of the space between the lifting shoes whereby the pallet may be engaged, lifted and supported by the lifting shoes when the truck is positioned to straddle the pallet, a heat insulating hood of substantially inverted U shape in cross section, lifting lugs disposed on opposite sides of the hood extending outwardly therefrom adjacent the lower edges thereof disposed to be engaged and supported by the lifting shoes when the truck is positioned to straddle the hood, the hood being disposed to be conveyed by the truck to seat in assembled relation on the pallet to cover the hot metal supported thereon, each of the lifting lugs having apertures therein for viewing the degree of engagement of the lifting shoes therewith and with the pallet from the truck, the hood being of a length sufficient to extend lengthwise of the straddle truck when seated over the hot metal on the pallet to provide a heat insulating barrier between the hot metal and the rubber tired wheels of the truck when the pallet, hot metal and hood assembly is carried by the lifting shoes of the truck.

3. In apparatus for conveying hot metal in the form of ingot and intermediate steel mill product and comprising a straddle truck supported for movement on spaced rubber tired wheels and having a pair of spaced inwardly extending lifting shoes disposed to be actuated inwardly and upwardly thereof, the combination therewith of, a metallic pallet for receiving and supporting the hot metal thereon, the pallet having a width greater than that of the hot metal but less than that of the space between the lifting shoes whereby the pallet may be engaged, lifted and supported by the lifting shoes when the truck is positioned to straddle the pallet, and a heat insulating hood of substantially inverted U shape in cross section having outwardly extending lifting lugs adjacent the lower edges thereof disposed to be engaged and supported by the lifting shoes when the truck is positioned to straddle the hood, the hood having open ends and being disposed to be conveyed by the truck lengthwise over the hot metal to be seated in assembled relation on the pallet to cover the hot metal when the truck straddles the pallet, the hood being of a length sufficient to extend lengthwise of the straddle truck when seated over the hot metal on the pallet to provide a heat insulating barrier between the hot metal and the rubber tired wheels of the truck when the pallet, hot metal and hood assembly is carried by the lifting shoes of the truck, the open ends of the hood facilitating the dissipation of heat radiated from the hot metal of the assembly away from the truck when the assembly is supported by the lifting shoes and conveyed from one location to another by the truck.

4. In apparatus for conveying hot metal in the form of ingot and intermediate steel mill products and comprising a straddle truck supported for movement on spaced rubber tired wheels and having a pair of spaced inwardly extending lifting shoes disposed to be actuated inwardly and upwardly thereof, the combination therewith of, a metallic pallet for receiving and supporting the hot metal thereon, the pallet having a width greater than that of the hot metal but less than that of the space between the lifting shoes whereby the pallet may be engaged, lifted and supported by the lifting shoes when the truck is positioned to straddle the pallet, a heat insulating hood of substantially inverted U shape in cross section, lifting lugs disposed on opposite sides of the hood extending outwardly therefrom adjacent the lower edges thereof disposed to be engaged and supported by the lifting shoes when the truck is positioned to straddle the hood, the hood having open ends and being disposed to be conveyed by the truck lengthwise over the hot metal to be seated in assembled relation on the pallet to cover the hot metal when the truck straddles the pallet, each of the lifting lugs having apertures therein for viewing the degree of engagement of the lifting shoes therewith and with the pallet from the truck, the hood being of a length sufficient to extend lengthwise of the straddle truck when seated over the hot metal on the pallet to provide a heat insulating barrier between the hot metal and the rubber tired wheels of the truck when the pallet, hot metal and hood assembly is carried by the lifting shoes of the truck, the open ends of the hood facilitating the dissipation of heat radiated from the hot metal of the assembly away from the truck when the assembly is supported by the lifting shoes and conveyed from one location to another by the truck.

5. In apparatus for conveying hot metal in the form of ingot and intermediate steel mill product and comprising a straddle truck supported for movement on spaced rubber tired wheels and having a pair of spaced inwardly extending lifting shoes disposed to be actuated inwardly and upwardly thereof, the combination therewith of, a metallic pallet for receiving and supporting the hot metal thereon, the pallet having a width greater than that of the hot metal but less than that of the space between the lifting shoes whereby the pallet may be engaged, lifted and supported by the lifting shoes when the truck is positioned to straddle the pallet, and a heat insulating hood of substantially inverted U shape in cross section having means disposed to be engaged by the lifting shoes to support the hood when the truck is positioned to straddle the hood, the hood being disposed to be conveyed by the truck to seat in assembled relation on the pallet to cover the hot metal supported thereon, the hood being of a length sufficient to extend lengthwise of the straddle truck when seated over the hot metal on the pallet to provide a heat insulating barrier between the hot metal and the rubber tired wheels of the truck when the pallet, hot metal and hood assembly is carried by the lifting shoes of the truck.

6. In apparatus for conveying hot metal in the form of ingot and intermediate steel mill product and comprising a straddle truck supported for movement on spaced rubber tired wheels and having a pair of spaced inwardly extending lifting shoes disposed to be actuated inwardly and upwardly thereof, the combination therewith of, a metallic pallet for receiving and supporting the hot metal thereon, the pallet having a width greater than that of the hot metal but less than that of the space between the lifting shoes whereby the pallet may be engaged, lifted and supported by the lifting shoes when the truck is positioned to straddle the pallet, and a heat insulating hood of substantially inverted U shape in cross section having means disposed to be engaged by the lifting shoes to support the hood when the truck is positioned to straddle the hood, the hood having open ends and being disposed to be conveyed by the truck lengthwise over the hot metal to be seated in assembled relation on the pallet to cover the hot metal when the truck straddles the pallet, the hood being of a length sufficient to extend lengthwise of the straddle truck when seated over the hot metal on the pallet to provide a heat insulating barrier between the hot metal and the rubber tired wheels of the truck when the pallet, hot metal and hood assembly is carried by the lifting shoes of the truck, the open ends of the hood facilitating the dissipation of heat radiated from the hot metal of the assembly away from the truck when the assembly is supported by the lifting shoes and conveyed from one location to another by the truck.

No references cited.